United States Patent Office 2,804,447
Patented Aug. 27, 1957

2,804,447

VULCANIZING CHLOROPRENE RUBBER WITH THE AID OF N,N' DI(OXYDIETHYLENE) THIOUREA

Ralph A. Naylor, Stamford, Conn., assignor to American Cyanamid Company, New York, N. Y., a corporation of Maine No Drawing. Application February 26, 1954, Serial No. 412,951

2 Claims. (Cl. 260—79.5)

This invention relates to the vulcanization of rubber. More particularly, it is concerned with the vulcanization of a chloroprene rubber and still more specifically it relates to the vulcanization of nonsulfur-modified chloroprene rubbers designated as neoprene type W, type WHV and type WRT.

It had been known prior to this invention that polymerized 2-chlorobutadiene 1,3 could be vulcanized with or without the aid of a vulcanization assistant. However, the chloroprene rubber so vulcanized or cured lacked any improvement with respect to vulcanizate properties, such as modulus (i. e., stress at 300% elongation), tensile strength, percent elongation at the breaking point or suitable aging characteristics. In general, accelerators used for rubber were of little or no value in curing synthetic rubbers known as polymerized chloroprene.

According to the present invention, the above difficulties are surprisingly and readily overcome by adding to a formulation of chloroprene rubber a thiourea vulcanization accelerator characterized by the formula:

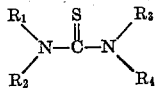

In the above formula, $R_1$, $R_2$, $R_3$, and $R_4$ are hydrogen, lower alkyl, lower cycloalkylidine or alkenyl radicals and $R_1$ and $R_2$ together as well as $R_3$ and $R_4$ together may represent the N-morpholino radical, wherein not more than two of the R's are hydrogen.

Among the substituted thioureas that may be used are N,N-dimethylourea, N,N-diethylthiourea, N,N-dipropylthiourea, N,N-dibutylthiourea, N,N-divinylthiourea, N,N-diallylthiourea, N,N-dibutenylthiourea, N-oxydiethylenethiourea, N,N-dicyclobutylidinethiourea, N,N-dicyclopentylidinethiourea, N,N-dicyclohexylidenethiourea, N,N-diethylthiourea, N,N'-diethylthiourea, N,N,N',N'-tetraethylthiourea, N,N'-di(oxydiethylene)-thiourea, N,N'-ditertbutylthiourea, N,N,N',N'-tetramethylthiourea and N,N-diethyl-N'oxydiethylenethiourea.

A synthetic rubber made by polymerizing 2-chlorobutadiene 1,3 (known as neoprene) may be vulcanized or cured by adding the designated accelerator to an unvulcanized chloroprene rubber composition. Alternatively the accelerator may be added to a partially cured neoprene polymer. As a preferred embodiment of the invention, it is preferred to accelerate the vulcanization of neoprene type "W." The latter neoprene is a nonsulfur-modified rubber made by the emulsion polymerization of chloroprene and which is devoid of sulfur, thiuram disulfide or other compounds capable of decomposing to provide either free sulfur or a vulcanization accelerator.

The amount of accelerator added to the rubber composition may vary from 0.25 to 2.5 parts per 100 parts of polymer. The average range for most purposes is about from 0.5–1.5 parts of accelerator per 100 parts of polymer.

Temperatures which can be employed to cure neoprene polymer compositions may vary from about 120° C. to 200° C. depending on the time of cure and amount of accelerator added. In general, adding larger amounts of accelerator to the composition and employing a longer curing time, the temperature should proportionately be reduced. It has been found that for the customary time of cure and accelerator addition, the temperature of curing may vary from about 140° C. to about 160° C. For excellent results, a temperature of 153° C. is employed.

In the examples which follow, a typical stock formulation with or without a vulcanization assistant is illustrated to which, however, this invention is not to be limited. The parts in these examples are by weight.

Example 1

A batch mixture comprising the following:

| | |
|---|---:|
| Neoprene type W | 100 |
| Phenyl alpha naphthylamine | 2 |
| Stearic acid | 0.5 |
| Light calcined magnesia | 2 |
| Semi reinforced furnace (SRF) black | 29 |
| Zinc oxide | 5 |
| N,N-diethylthiourea | 0.5 | is cured at 153° C. for 10, 20 and 40 minutes, respectively.

Example 2

Example 1 is repeated with the omission of a vulcanization assistant.

Example 3

Example 1 is repeated except that the vulcanization assistant is N,N-diisopropylthiourea.

Example 4

Example 1 is repeated but the substituted thiourea is N,N-diallylthiourea.

Example 5

In this example, N-oxydiethylenethiourea is the vulcanization assistant following the procedure of Example 1.

Example 6

Example 1 is repeated but the vulcanization catalyst is N,N-dicyclohexylidenethiourea.

Example 7

N,N-diethyl-N'-oxydiethylenethiourea replaces the vulcanization catalyst of Example 1 and that example is repeated.

Example 8

Following the procedure of Example 1, N,N,N',N'-tetramethylthiourea replaces the substituted thiourea therein.

Example 9

In the procedure of Example 1, N,N'-di-tert-butylthiourea (0.5 part) replaces the vulcanization aid therein.

Example 10

In the procedure of Example 1, N,N'-di(oxydiethylene)-thiourea replaces the substituted thiourea of Example 1.

Example 11

In the procedure of Example 1, N,N,N',N'-tetraethylthiourea is substituted for the thiourea therein.

The characteristics of the neoprene rubber thus vulcanized in the foregoing examples are tabularized below.

| Example | Accelerator | Scorch [1] | 10 minutes at 153° C. | | | 20 minutes at 153° C. | | | 40 minutes at 153° C. | | |
|---|---|---|---|---|---|---|---|---|---|---|---|
| | | | Modulus at 300% | Tensile | Percent Elong. | Modulus at 300% | Tensile | Percent Elong. | Modulus at 300% | Tensile | Percent Elong. |
| 1 | N,N diethyl thiourea | 10 | 925 | 2,500 | 520 | 1,175 | 2,700 | 480 | 1,250 | 2,675 | 460 |
| 2 | None | over 70 | 75 | 600 | 900 | 500 | 575 | 800 | 575 | 2,700 | 780 |
| 3 | N,N diisopropyl thiourea | 27 | too soft to test | | | 525 | 1,500 | 860 | 525 | 2,300 | 770 |
| 4 | N,N diallyl thiourea | 14 | 1,050 | 3,575 | 630 | 1,175 | 3,450 | 580 | 1,200 | 3,625 | 595 |
| 5 | N oxydiethylene thiourea | 14 | 1,125 | 3,200 | 570 | 1,300 | 3,200 | 525 | 1,350 | 3,125 | 505 |
| 6 | N,N dicyclohexylidene thiourea | 17 | 475 | 2,625 | 820 | 725 | 3,150 | 720 | 775 | 3,375 | 710 |
| 7 | N,N - diethyl - N'-oxydiethylene thiourea | 27 | 975 | 3,000 | 640 | 1,025 | 3,250 | 650 | 1,050 | 3,075 | 620 |
| 8 | Tetramethyl thiourea | 9 | 1,200 | 3,050 | 580 | 1,250 | 3,150 | 550 | 1,250 | 3,000 | 520 |
| 9 | N,N' di tert. butyl thiourea | 15 | | | | 1,125 | 1,950 | 590 | 1,125 | 2,950 | 660 |
| 10 | N,N'-di(oxydiethylene)-thiourea | 31 | 1,100 | 3,350 | 600 | 1,175 | 3,325 | 610 | 1,150 | 3,475 | 640 |
| 11 | Tetra ethyl thiourea | 19 | 650 | 2,650 | 840 | 825 | 3,000 | 750 | 925 | 3,250 | 670 |

[1] Mooney Scorch—time in minutes for a ten point rise above the minimum reading using the small rotor at 250° F.
Modulus and tensile strength in p. s. i.

It is evident from the table above that the neoprene vulcanized composition with substituted thioureas demonstrate increased modulus (i. e., stress at 300% elongation), tensile strength, and elongation at the breaking point as compared with no accelerator.

The vulcanized neoprene rubber made in accordance with this invention is useful for services where improved strength is desirable in addition to the normally good oil and heat resistance of the polymer as for example as gasoline filling hoses and motor mountings.

Suitable variations and changes in the invention may be made without departing from the spirit thereof or the scope of the appended claims.

I claim:

1. A process for improving the modulus, tensile strength and elongation of chloroprene rubber compositions which comprises the steps of: incorporating a small amount of between 0.25% and 2.5% of N,N' di(oxydiethylene)-thiourea into an unvulcanized vulcanizable chloroprene rubber, and curing said composition at vulcanization temperatures.

2. The process according to claim 1 in which the chloroprene rubber is a nonsulfur-modified chloroprene polymer.

References Cited in the file of this patent

UNITED STATES PATENTS 2,544,746    Baum _____ Mar. 31, 1951

OTHER REFERENCES

"Chemistry and Technology of Rubber," Davis et al., Reinhold Pub. Co., 1937, page 311. (Copy in Sci. Libr.)